(12) United States Patent  
Boka et al.

(10) Patent No.: US 9,335,127 B1
(45) Date of Patent: May 10, 2016

(54) SYSTEM AND METHOD FOR DEFENSE AGAINST RADAR HOMING MISSILES

(75) Inventors: Jeffrey B. Boka, Lumberton, NJ (US); Joseph T. Corso, Riverton, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 973 days.

(21) Appl. No.: 13/546,722

(22) Filed: Jul. 11, 2012

(51) Int. Cl.
| | | |
|---|---|---|
| *F41H 11/02* | (2006.01) | |
| *G01S 7/38* | (2006.01) | |
| *F41G 7/30* | (2006.01) | |
| *G01S 13/88* | (2006.01) | |
| *F41G 7/22* | (2006.01) | |
| *F41H 11/00* | (2006.01) | |
| *G01S 7/00* | (2006.01) | |

(52) U.S. Cl.
CPC .............. *F41G 7/301* (2013.01); *F41G 7/224* (2013.01); *F41H 11/02* (2013.01); *G01S 13/883* (2013.01)

(58) Field of Classification Search
CPC ....... F41H 11/02; G01S 13/88; G01S 13/883; G01S 7/02; G01S 7/38; F41G 7/20; F41G 7/30; F41G 7/301; F41G 7/22; F41G 7/2226; F41G 7/224; F41G 7/2246; F41G 7/2253; F41G 7/226; F41G 7/2273; F41G 7/2286
USPC .......... 89/1.11; 244/3.1–3.19; 342/13–20, 61, 342/62
See application file for complete search history.

(56) References Cited

U.S. PATENT DOCUMENTS

| | | | | |
|---|---|---|---|---|
| 4,682,172 | A | * | 7/1987 | Kuhrdt ............................ 342/15 |
| 4,743,905 | A | * | 5/1988 | Wiegand ......................... 342/14 |
| 4,823,139 | A | * | 4/1989 | Eisner et al. .................... 342/15 |
| 4,990,920 | A | * | 2/1991 | Sanders, Jr. ..................... 342/14 |
| 5,061,930 | A | * | 10/1991 | Nathanson et al. ............. 342/13 |
| 5,136,295 | A | * | 8/1992 | Bull et al. ................. G01S 7/38 342/15 |
| 5,495,787 | A | * | 3/1996 | Boyer, III ...................... 89/1.11 |
| 6,424,286 | B1 | * | 7/2002 | Smith et al. ..................... 342/14 |
| 6,542,109 | B2 | * | 4/2003 | Lloyd et al. ............. F41H 11/02 342/13 |
| 6,806,823 | B1 | * | 10/2004 | Smith et al. ..................... 342/62 |
| 7,605,747 | B1 | | 10/2009 | Mookerjee et al. |
| 7,982,655 | B2 | * | 7/2011 | Zahavi et al. ................... 342/15 |
| 8,044,841 | B1 | | 10/2011 | Boardman et al. |
| 8,049,656 | B2 | * | 11/2011 | Shani et al. ............... G01S 7/38 342/13 |
| 8,106,340 | B1 | | 1/2012 | Diaz et al. |
| 8,115,148 | B1 | | 2/2012 | Boardman et al. |
| 8,130,137 | B1 | | 3/2012 | Luu et al. |
| 8,134,103 | B2 | | 3/2012 | Luu et al. |
| 8,138,965 | B1 | | 3/2012 | Luu et al. |
| 8,288,696 | B1 | | 10/2012 | Boka et al. |
| 8,358,238 | B1 | * | 1/2013 | Friedman ....................... 342/62 |

* cited by examiner

*Primary Examiner* — Bernarr Gregory
(74) *Attorney, Agent, or Firm* — Howard IP Law Group, P.C.

(57) ABSTRACT

A defensive interceptor missile is provided for defending a target against a radar-homing attack missile. A Missile Anti-Ship Kill Enhancement System (MASKES) comprises a defensive missile with digital RF memory device for (a) receiving radar signals from an attack missile, (b) processing received attack missile signals, and (c) transmitting amplified, Doppler shifted signals toward the attack missile such that the attack missile would interpret signals as being reflected off ship and target the source of the reflective signal, the defensive interceptor missile.

10 Claims, 6 Drawing Sheets

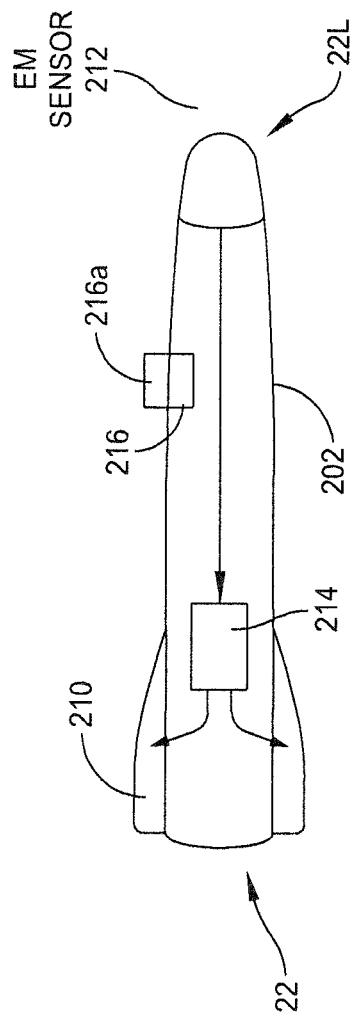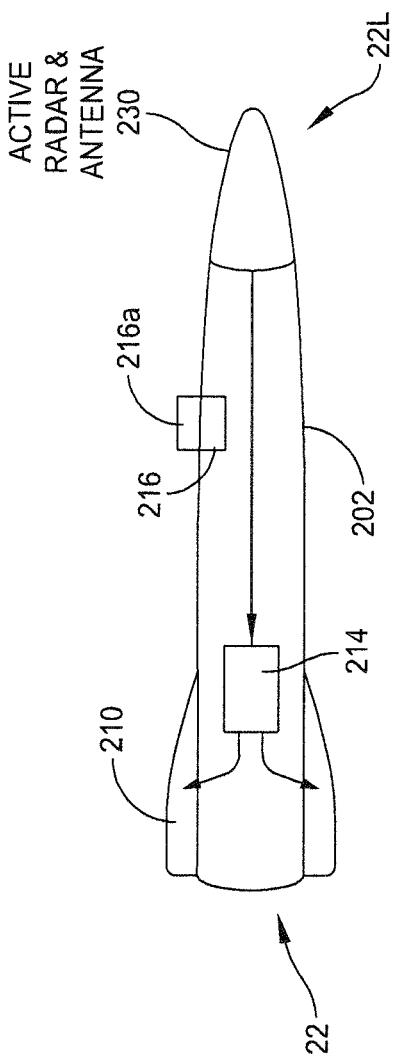

SYSTEM AND METHOD FOR DEFENSE AGAINST RADAR HOMING MISSILES

FIELD

The present disclosure relates generally to defense systems, and more particularly, to systems and methods for defending against missiles utilizing radar homing systems.

BACKGROUND

Anti-ship missiles (ASMs) and other attacking missiles are generally fitted with radar homing systems that can actively detect and home on ships and other targets. These systems provide guidance measurements for the attacking missiles or ASMs, leveraging the targeted ship's strong radar return as well as the ship's inability to quickly maneuver to evade an attacking missile. More specifically, the attacking missile's on-board radar unit directs radar signals towards the ship, which are then reflected back to the attacking missile, providing a radar feedback of the ship's location. The guidance task on the attacking missile is relatively simple, as the ship represents a large, essentially non-moving target having a significant reflective surface which results in strong signal returns to the attacking missile.

Ship defenses against these attacking missiles depend upon their ability to timely detect the presence of an attacking missile using an organic ship radar, and subsequently initiate a defensive system to negate the detected threat. These defensive systems may include, for example, anti-air warfare (AAW) or interceptor missiles, configured to be launched and guided towards the ASM if time permits as a first line of defense. Subsequent defensive measures, such as automatic radar-guided cannon fire, may also be used.

Like the ASMs, these interceptor missiles may also be equipped with radar guidance systems to track, intercept and destroy the attacking missile. However, the interceptor missile's guidance task is generally much more difficult, as the reflective surface of the attacking missile is relatively small, and thus the resulting power of the reflected radar signals off the attacking missile is generally low. This low power reflected radar signal may result in ambiguous interceptor guidance solutions due to the sea, land, and atmospheric clutter and noise prevalent in the interceptor missile's resultant radar measurements. In addition, the ASMs are traveling at much higher rates of speed compared to the targeted ship or asset. Thus, the job of the interceptor missile's guidance system to neutralize the attacking missile is relatively difficult.

Improved or alternative defensive systems utilizing interceptor missiles against radar-guided attack missiles are desired.

SUMMARY

A defensive interceptor missile according to an aspect of the disclosure is configured to defend an object or target, such as a ship, against a radar-homing attacking missile. A defensive interceptor missile according to embodiments of the present invention may comprise an electronic device, such as a digital radio frequency memory (DRFM) device, for receiving radar signals from the attacking missile (radar signals that are intended to locate the ship), and for recording, processing, amplifying, and re-transmitting the received radar signal towards the attacking hostile missile. A radar transmitter, integrated with the DFRM unit and integral with the interceptor's seeker system, will transmit the amplified signals toward the attacking missile so that the attacking missile interprets the processed transmitted signals as being reflected off the targeted ship. This results in the attacking missile changing its course towards the source of the reflective signal (i.e. towards the defensive interceptor missile). Thus, there are two simultaneous actions which enhance the mission success of the interceptor missile to defend the ship against the attacking missile: (1) the attacking missile is diverted away from its intended target, the ship, towards the interceptor missile, and (2) the attacking missile tends to close out the miss distance between itself and the interceptor missile so that the warhead on the interceptor will become more effective in destroying the attacking missile.

Implementation of such a device integrated onto a guided missile (interceptor missile) enhances the ability of the guided missile to intercept and destroy an incoming hostile missile headed for the launch platform of the guided missile.

According to an aspect of the disclosure, there is provided a defensive interceptor missile for defending a target against a radar-homing attack missile. A Missile Anti-Ship Kill Enhancement System (MASKES) comprises a defensive missile with digital RF memory device for (a) receiving radar signals from the attack missile, (b) processing received attack missile signals, and (c) transmitting amplified, Doppler shifted signals toward the attack missile such that the attack missile would interpret signals as being reflected off ship and target the source of the reflective signal, the defensive interceptor missile.

BRIEF DESCRIPTION OF THE DRAWINGS

FIGS. 2A and 2B are simplified representations of a defensive interceptor missile fitted with a DRFM unit according to embodiments of the disclosure.

DETAILED DESCRIPTION

Figure 1:
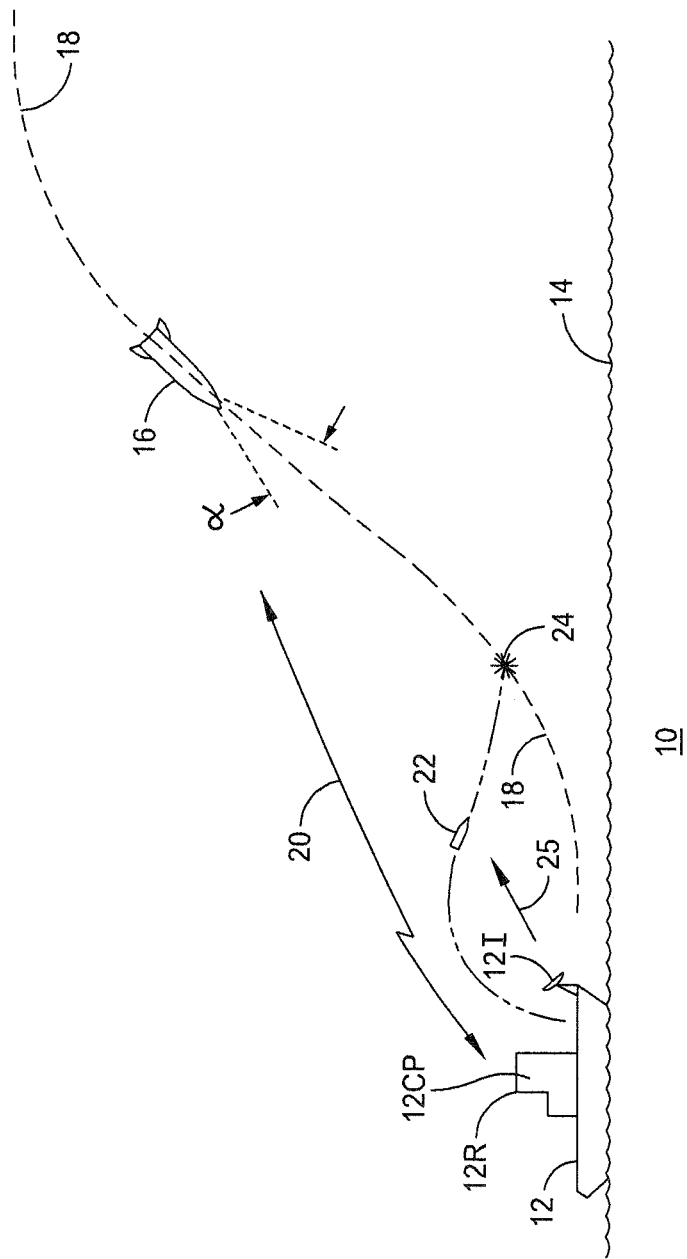
FIG. 1 is a simplified scenario illustrating a ship under attack by a radar-guided ASM and defended by a radar-guided defensive interceptor missile.

It is to be understood that the figures and descriptions of the present invention have been simplified to illustrate elements that are relevant for a clear understanding of the present invention, while eliminating, for purposes of clarity, many other elements found in typical missile, radar and signal processing systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Reference is made herein to both attacking and defending missiles. The attacking missiles may also be referred to as hostile missiles, missile threats, or simply as threats. The defending missiles are those defensive missiles, which may also be referred to as interceptors or interceptor missiles, that are fired from ships or other assets under attack in order to defend themselves against the attacking missile threats.

As set forth above, attacking missiles configured to attack ships and/or other relatively large, slow objects, have a distinct guidance advantage over defensive interceptor missiles equipped with conventional homing guidance functionality. For example, the defensive interceptor missile has the difficult task of closing the fire control guidance loop between the relatively small sized attack missiles flying at subsonic or supersonic speeds. Embodiments of the present invention may enhance the capabilities of the defending interceptor missiles by equipping them with a device that will mis-guide the homing system on-board the attacking missile so that it will direct itself away from the intended target (e.g. ship), and instead, target the interceptor missile. In addition to guiding the attacking missile away from its intended target, embodiments of the present invention also increase the probability of the interceptor missile destroying the attacking threat.

More specifically, embodiments described herein may incorporate DRFM units onto a defensive interceptor missile, functioning independent of the missile's guidance system. The DRFM units, when activated automatically at the appropriate range from the attacking missile, are configured to receive, store and retransmit at amplified power the radar signals being transmitted by the attacking missile. The guidance system of the attacking missile will treat these retransmitted signals from the DRFM unit as echoes from its intended target (i.e. the ship). This will cause the attacking missile to redirect its course towards the DRFM unit, and thus, toward the interceptor missile. Redirection of the attacking missile towards the interceptor missile causes the attacking missile to fail in its mission to destroy the ship or asset, and also increases the probability of a collision with the interceptor missile, thereby increasing the kill effectiveness of the interceptor missile.

A DRFM unit of a defensive interceptor missile, according to embodiments of the present invention is configured to, for example, receive radio frequency (RF) signals, store them in a memory gate array and, after a scheduled delay, retransmit the signals in a manner that retains at least a portion of the signals' frequency content. These DRFM units, when integrated into an interceptor's guidance system, provide the following mode of operation:

1. When the interceptor missile is fired by the ship under attack, the DRFM unit is turned on automatically by the missile after launch. The timing of initialization of the DRFM unit is established during the prelaunch fire control process and is a function of the expected terminal homing time remaining before intercept and the power consumption requirements of the DRFM unit.
2. The DRFM unit will begin to receive and store in memory homing signals being transmitted by the missile attacking the ship or other defended assets.
3. The DRFM unit will perform signal processing on the signals stored in memory to account for Doppler shifts expected from a stationary ship and amplify the signals.
4. When the DRFM unit on the interceptor begins to retransmit the stored signals, these signals are received in the homing guidance system aboard the attacking missile where they are interpreted as return signals or echoes from the originally transmitted signals.
5. Upon receipt of the modulated return signals, the guidance system on the attacking missile will operate to guide the attacking missile away from its intended target, and towards the apparent direction of the perceived echo signals (e.g. the direction of the interceptor missile).

Thus, the DRFM unit's mode of operation results in two engagement consequences. The first is that the attacking missile is denied the ability to successfully complete its mission of targeting and disabling or destroying the ship. The second consequence is that by guiding the attacking missile toward the interceptor missile, the probability that the interceptor missile destroys the attacking missile is also improved.

Referring generally to FIG. 1, a ship under attack scenario 10 involves a ship 12, a horizon 14 and an attacking ASM 16. ASM 16 utilizes radar signals transmitted over some angle α and the associated reflected signals received from ship 12 to guide itself toward ship 12. The guidance arrangement of ASM 16 is set to follow a track or path illustrated by dash line 18, such that its final approach to ship 12 is made generally horizontally, which has the advantage of making ship defensives look down at the surface of the water rather than upward at the sky.

Ship 12 detects the presence of ASM 16 using a radar system 12R for generating radar signals 20. Ship 12 also includes computer processors 12CP which calculate or predict paths of ASM 16, as well as paths of a defensive or AAW interceptor missile 22 in any number of known ways which will be understood by one of ordinary skill in the art. Interceptor missile 22 may be autonomous after launch, or it may be guided toward a waypoint by commands received from ship 12, based on tracking provided by radar 12R. Further, interceptor missile 22 may be autonomous after it reaches the waypoint, and may home on ASM 16 in response to reflected electromagnetic signals from the ASM (active homing) or from ship 12 (semi-active homing). The desired result of launching and guiding interceptor missile 22 is to intercept ASM 16 at or near a interception location 24. The attack mode may be hit-to-kill, or may be by the use of an explosive warhead.

The source of the electromagnetic signals which are reflected off ASM 16 of FIG. 1 may be radar system 12R of ship 12. In another embodiment, these signals may be generated by an illuminator in a semi-active homing system, illustrated as 12I, which transmits radar-like signals 25 so that radar system 12R may continue to be used for other purposes, such as surveillance. It is also possible for interceptor missile 22 to be equipped with its own active radar homing system for tracking ASM 16.

Referring generally to FIG. 2A, defensive interceptor missile 22 according to an aspect of this disclosure includes directional control elements 210, which may be thrust vectoring devices or aerodynamic elements. The forward or leading end 22L of interceptor missile 22 may be associated with at least an electromagnetic receiver or sensor 212, for example, a semi-active radar receiver. Electromagnetic receiver 212 may be configured to receive electromagnetic reflections from, for example, ASM 16. The forward or leading end 22L of defensive interceptor missile 22 may also include a complete active radar system 230 for tracking attacking ASM 16 and providing at least angular target information for a guidance controller illustrated as a block 214 (FIG. 2B). In an alternate embodiment, tracking may be achieved using, for example, information provided by the host asset's (e.g. the ship's) radar system. Guidance controller 214 of FIGS. 2A-B controls, for example, thrust vectoring elements 210 so as to cause interceptor missile 22 to home toward a predicted intercept position 24.

According to an aspect of the disclosure, defensive interceptor missile 22 of FIG. 2A or 2B is fitted with an electronic device 216, such as a DRFM unit. Electronic device 216 includes, for example, an antenna portion 216a, which may also be incorporated into receiver 212. Antenna portion 216a may be forward-looking relative to the interceptor missile's motion, or it may be nominally omnidirectional. Electronic device 216 may be broadband in the sense that it is configured to operate over a range or ranges of radar frequencies which may be used by an attacking ASM. Electronic device 216 may filter received signals to limit the band pass to those frequencies that the ASM is expected to be operating within. Electronic device 216 may operate independently from the interceptor missile's own guidance system. In such an embodiment, electronic device 216 has the sole purpose of spoofing the anti-ship attack missile into "attacking" the interceptor missile which appears to the ASM as the source of the reflective radar energy that was transmitted by the ASM.

Electronic device 216 of defensive interceptor missile 22 of FIGS. 2A and 2B can be operated continuously during the end game flight of the defensive interceptor missile. In one embodiment, electronic device 216 receives radar signals transmitted by the attacking ASM via antenna 216a. These signals are stored in memory for processing, and subsequently retransmitted via antenna 216a, with, for example a greater amplitude and frequency shift, and with a time delay. The retransmitted radar signals should be sufficiently large such that, when arriving at the attacking ASM, its radar responds only to the retransmitted amplified signal from the interceptor missile instead of the actual radar reflections from the ship under attack. If the radar of the ASM believes that the retransmitted radar signal represents the ship being attacked, it will home toward the location of the transmitter, and thus the defensive interceptor missile. The motion of the defensive interceptor missile away from the ship will guide or lead the attacking ASM away from the actual location of the ship and toward the continually-changing location of the defensive interceptor missile.

Figure 3:
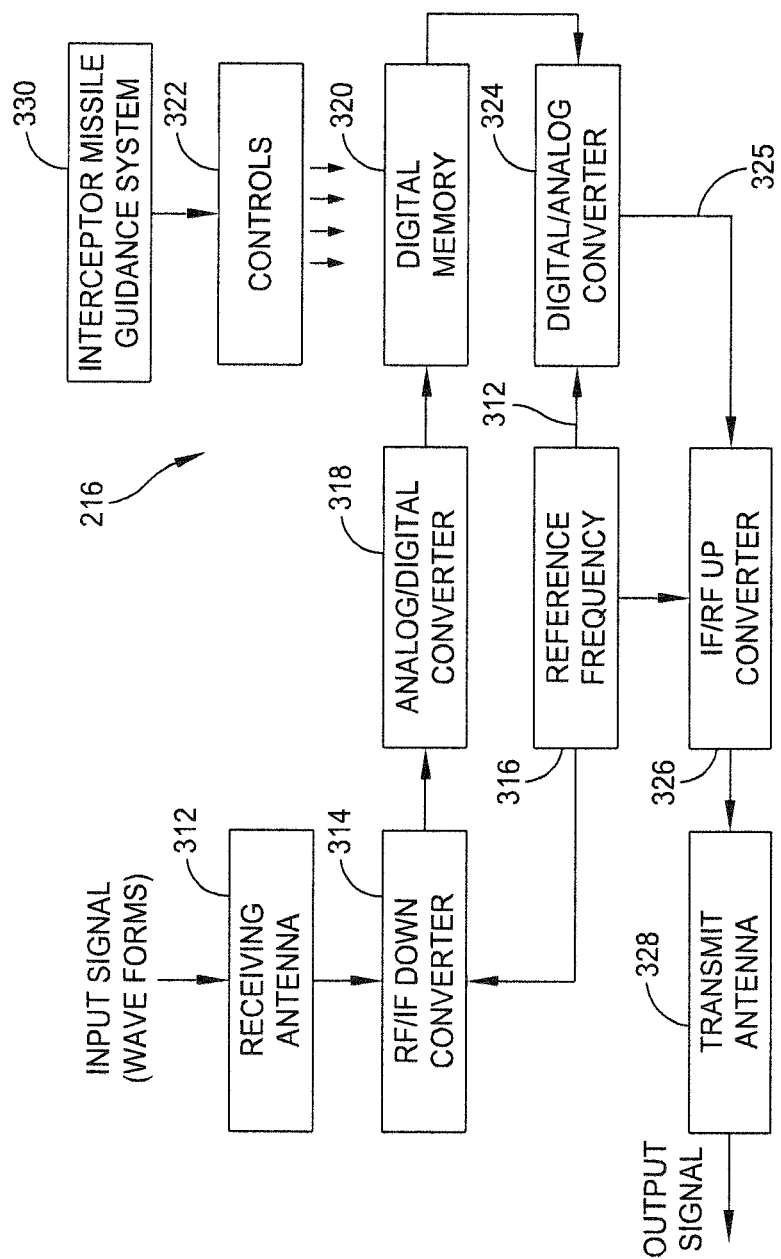
FIG. 3 is a simplified block diagram of a DRFM unit including a control function block that controls, for example, the turn-on time of the device and Doppler shift processing.

FIG. 3 is a simplified diagram of one possible embodiment of electronic device 216 of FIGS. 2A and 2B. As illustrated in FIG. 3, electronic device 216 comprises a DRFM unit associated with two antenna elements, which may be mounted, for example, on the exterior of a defensive interceptor missile, such as interceptor missile 22 of FIGS. 2A and 2B. Receiving antenna 312 may be coupled to a Radio-Frequency Intermediate-Frequency (RF/IF) converter 314 for down-converting received RF signals from an attacking ASM to an intermediate reference-frequency signal relative to the source. A reference frequency module 316 may provide a frequency shift reference to converter 314 prior to analog to digital (A/D) conversion of the signal by converter 318. Module 316 computes the reference frequency to be used to form the signal that is transmitted back to the hostile missile; this includes computation of the expected Doppler reference frequency shift accounting for the speed of both the interceptor and hostile missiles and which will effectively make the interceptor missile to appear to be a slowly moving platform. The digital signal from converter 318 is applied to a digital memory device 320, which stores at least the amplitude-time and frequency characteristics of the received IF signal. User controls, illustrated as a block 322, control various aspects of electronic device 216, including the delay imparted by digital memory device 320 and the Doppler frequency shift by imparted by module 316, where the delay accounts for the gating time delay anticipated by the hostile missile and is a function of the initial distance from the hostile missile to the ship, both of which may be based on ship-interceptor-threat geometry and kinematics that block 322 receives, for example, from radar and/or guidance systems 230/330 onboard the interceptor missile, or from the guidance and/or radar systems of the host ship. More specifically, the frequency shift will be associated with the Doppler shift as received by an ASM based on a stationary ship echo as well as the down conversion frequency. A delay will be set to be consistent with the time delay expected based on the ship-to-anti-missile range divided by the speed of light. The digitally recorded frequency shifted signals are read from memory device 320 after the predetermined time, and are applied to a digital-to-analog converter (DAC) 324. DAC 324 also receives the reference frequency from module 316 to generate the analog replica of the stored or memorized digital frequency shifted analog signals. The IF-frequency version of the analog signal stored by memory device 320 is applied to a IF-to-RF up-converter 326, to thereby replicate the RF signals received by receive antenna 312, adjusted appropriately for the Doppler shift expected in the signal based on the geometry and kinematics of the ship-interceptor-threat objects. These replica RF signals are applied to a transmit antenna 328. The replica RF signals radiated by antenna 328 are at the same frequency plus the expected Doppler frequency shift as those radiated by the ASM.

It should be noted that embodiments of electronic device 216 illustrated in FIG. 3 may include several components not illustrated for the purposes of clarity. For example, as will be understood by one of ordinary skill in the art, a receiver may be provided for filtering and amplifying signals received by receiving antenna 312. Likewise, a transmitter, including one or more amplifiers, may be provided for amplifying the up-converted signal prior to transmission by antenna 328. This receiver and transmitter may also be embodied as a single transceiver. Further, it should be understood that although electronic device 216 comprises two antennas, various other arrangements may be implemented without departing from the scope of the present invention. For example, a single antenna and a circulator may be used in place of the two antenna embodiment shown.

Figure 4A:
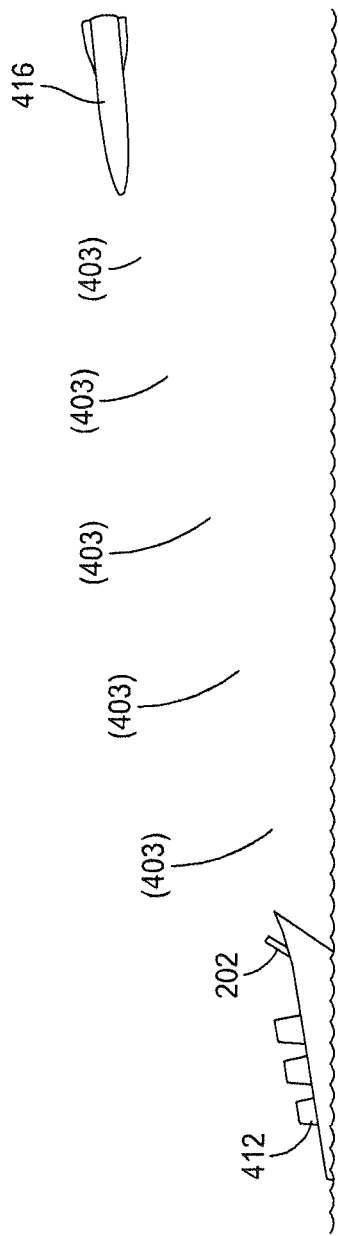
FIGS. 4A, 4B, 4C, 4D, and 4E are simplified scenarios illustrating the function of embodiments of the defense system according to the present disclosure.
Figure 4B:
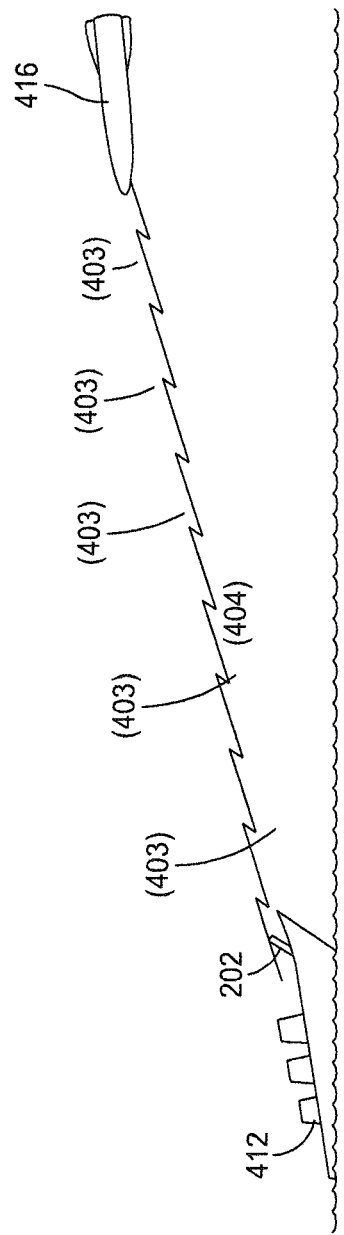

FIGS. 4A-4E provide a visual representation of the functionality of a defense system according to an embodiment of the present disclosure. Referring generally to FIG. 4A, a defensive interceptor missile 202 according to an aspect of the disclosure is used to defend a target, such as a ship 412, against a radar-directed homing ASM 416. As ASM 416 advances towards ship 412 it emits RF signals 403 that are part of the missile's homing system to locate and guide ASM 416 towards ship 412. In FIG. 4B, ship 412 emits RF radar signals 404 to detect ASM 416 and forms an intercept solution to launch defensive interceptor missile 202.

Figure 4C:
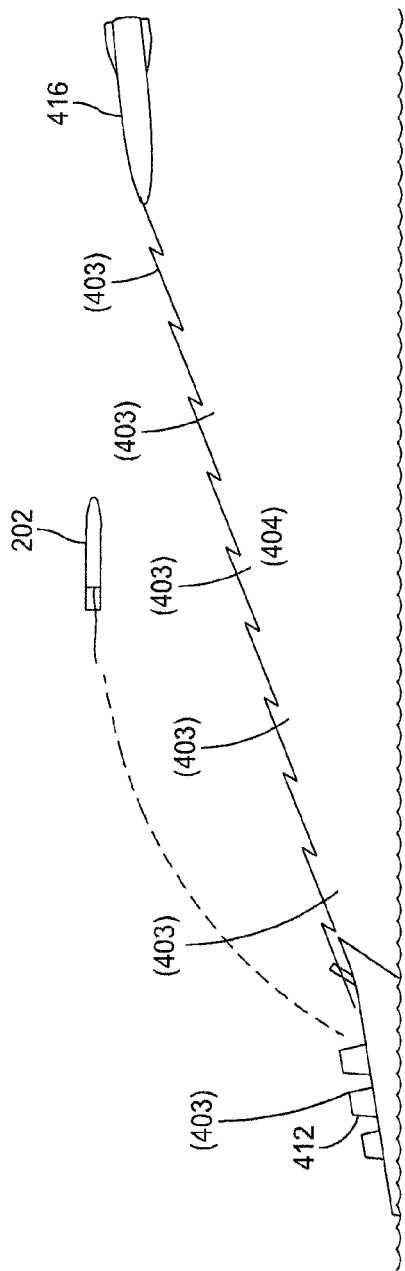
Figure 4D:
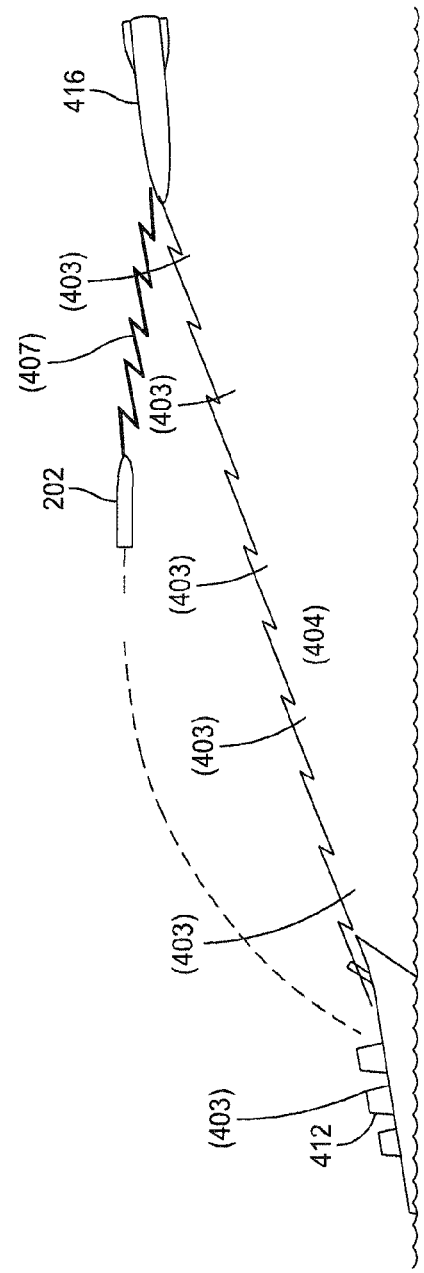
Figure 4E:
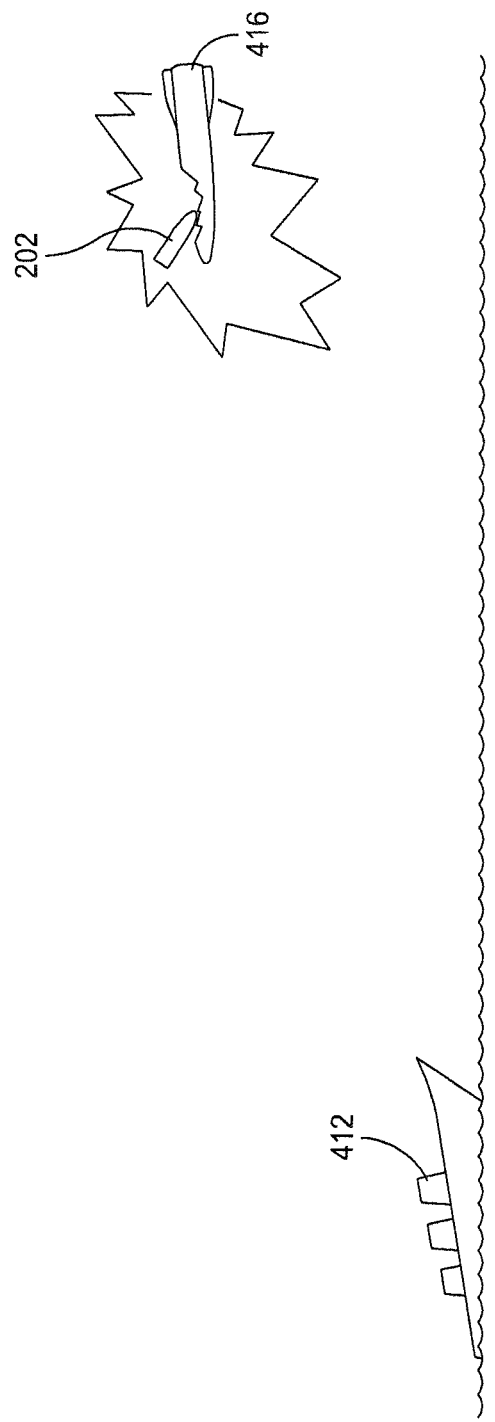

In FIGS. 4C and 4D, ship 412 has launched defensive interceptor missile 202 which is initially guided to a predicted intercept point using either command all the way guidance or inertial guidance information received from ship 412, or guided to a way point in support of semi-active homing. In route to the intercept point, defensive interceptor missile 202 receives the attack missile's RF radio signal 404 and records signal 404 into memory of a DRFM unit, amplifies the signal higher than the expected reflection off the ship, adjusts the frequency to be consistent with the Doppler shift expected based on the ship-interceptor-threat geometry and kinematics, and re-transmits the amplified signal back in the direction of ASM 416. ASM 416 updates its guidance solution and starts to guide to the source of the reflected RF signal from that has been transmitted by defensive interceptor missile 202. Finally, in FIG. 4E, ASM 416 has impacted or attacked defensive missile 202 thereby defeating the attack missile mission of hitting ship 412.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

The invention claimed is:

1. An interceptor missile for defending an intended target against a radar homing attack missile, said interceptor missile comprising:
   vectoring controls for directing said defensive interceptor missile toward said attack missile; and
   an electronic device configured to:
      receive radar signals from said attack missile to thereby form received attack missile signals,
      process said received attack missile signals to generate processed signals, said processed signals indicative of radar return signals originating from said radar signals from said attack missile reflecting off of said intended target, and
      transmit said processed signals toward said attack missile to guide said attack missile toward said interceptor missile.

2. The defensive interceptor missile according to claim 1, wherein the electronic device amplifies said received radar signals prior to transmission.

3. The defensive interceptor missile according to claim 2, wherein said electronic device includes a reference frequency source for adjusting said received attack missile signals according to an expected Doppler shift between said intended target, said interceptor missile, and said attack missile, and a controller for causing the transmission of said amplified signals after a delay consistent with an expected intended target to attack missile range.

4. The defensive interceptor missile according to claim 1, wherein said defensive interceptor missile further comprises an active radar system for generating and directing radar signals toward said attack missile, and for receiving reflected signals from said attack missile, to aid in homing said defensive missile toward said attack missile.

5. The defensive interceptor missile according to claim 1, wherein said electronic device includes a memory device for storing said processed signals.

6. A method for operating an interceptor missile against a radar-guided homing attack missile, said method comprising the steps of:
   launching an interceptor missile;
   homing said interceptor missile toward said attack missile;
   during said homing of said defensive interceptor missile, and on said defensive missile, receiving and processing radar signals received from said attack missile; and
   generating, based on said processed radar signals received from said attack missile, a radar signal indicative of radar return signals originating from said attack missile reflecting off of an intended target of said attack missile.

7. The method according to claim 6, further comprising the step of transmitting the generated radar return signal after a delay indicative of a range from said intended target to said attack missile.

8. The method according to claim 6, wherein said step of receiving and processing radar signals includes the step of frequency shifting said received signal consistent with Doppler frequency shift between said intended target, said interceptor missile and said attack missile geometries and kinematics.

9. The method according to claim 6, wherein said step of receiving and processing radar signals includes the step of amplifying the radar signals received from said attack missile.

10. The method according to claim 6, wherein said steps of receiving and processing include the steps of:
   downconverting analog radar signals received from said attack missile to thereby form downconverted analog received signals;
   Doppler shifting analog radar signals received from said attack missile to be consistent with intended target, interceptor missile and attack missile geometry and kinematics;
   converting said analog received signals to digital form to thereby form digital received signals;
   writing said digital received signals into a digital memory at a first time to thereby form stored digital signals;
   at a time later than said first time, reading said stored digital signals from said digital memory to thereby form delayed digital signals;
   converting said delayed digital signals to analog form to thereby form delayed analog signals;
   upconverting said delayed analog signals to thereby generate delayed radio-frequency signals; and
   transmitting said delayed radio-frequency signals.

* * * * *